(12) United States Patent
Dominick et al.

(10) Patent No.: US 11,210,192 B2
(45) Date of Patent: Dec. 28, 2021

(54) TECHNICAL IMPROVEMENT EVALUATION FOR A SET OF APPLICATIONS

(71) Applicant: Siemens Healthcare GmbH, Erlangen (DE)

(72) Inventors: Lutz Dominick, Eggolsheim (DE); Vladyslav Ukis, Nuremberg (DE)

(73) Assignee: Siemens Healthcare GmbH, Erlangen (DE)

( * ) Notice: Subject to any disclaimer, the term of this patent is extended or adjusted under 35 U.S.C. 154(b) by 125 days.

(21) Appl. No.: 16/565,726

(22) Filed: Sep. 10, 2019

(65) Prior Publication Data

US 2020/0089591 A1 Mar. 19, 2020

(30) Foreign Application Priority Data

Sep. 17, 2018 (EP) ..................... 18194787

(51) Int. Cl.
*G06F 11/34* (2006.01)
*G06F 11/30* (2006.01)
*G06K 9/62* (2006.01)

(52) U.S. Cl.
CPC .......... *G06F 11/34* (2013.01); *G06F 11/3051* (2013.01); *G06K 9/6201* (2013.01)

(58) Field of Classification Search
None
See application file for complete search history.

(56) References Cited

U.S. PATENT DOCUMENTS

| 2007/0112956 | A1 | 5/2007 | Chapman et al. |
| 2009/0217247 | A1 | 8/2009 | Kamigata et al. |
| 2011/0270963 | A1* | 11/2011 | Saito ..................... G06F 11/302 709/224 |
| 2018/0143891 | A1 | 5/2018 | Polisetty et al. |

OTHER PUBLICATIONS

NPL: Extended European Search report for EP Application Patent No. EP18194787, dated Apr. 23, 2019 and English translation herewith.

* cited by examiner

*Primary Examiner* — Farley Abad
*Assistant Examiner* — Dayton Lewis-Taylor
(74) *Attorney, Agent, or Firm* — Harness, Dickey & Pierce, P.L.C.

(57) ABSTRACT

A method, an improvement evaluation system and a computer readable medium are usable for automatically calculating an improvement evaluation result for operating a set of registered applications. Each of the set of registered applications of the system includes a declaration interface, adapted for providing a self-declaration by way of a formula, indicating whether the application is operated under predefined success conditions; and a collector, adapted for collecting measurement data during runtime to be introduced in the formula. The system further includes a network for transferring the formula to an evaluation unit for evaluation; and a result interface for providing an improvement evaluation result, reflecting an improvement potential for the respective application to be operated in the set of applications.

17 Claims, 1 Drawing Sheet

TECHNICAL IMPROVEMENT EVALUATION FOR A SET OF APPLICATIONS

PRIORITY STATEMENT

The present application hereby claims priority under 35 U.S.C. § 119 to European patent application number EP 18194787.0 filed Sep. 17, 2018, the entire contents of which are hereby incorporated herein by reference.

FIELD

Embodiments of the invention generally relate to a method, system and program for evaluation of improvements potentials for a set of applications.

BACKGROUND

In a medical environment, typically a set of applications is executed under different operating conditions. For example, a reconstruction software may be deployed on a first system with a first system architecture (processing power, memory capacity etc.) and a first set of data and on a second system with a second system architecture and a second set of data. Depending on the system, usage pattern and/or data sets, the respective application may be operated more or less successfully. Thus, in some examples the first scenario may have an improvement potential (e.g. with respect to providing more local processing and storage capacity), whereas the second scenario does not.

In a typical medical computing infrastructure, a set of applications is provided. During normal operation, possible options for improvement are not detectable without administrative effort. Usually, a system administrator needs to draw up a technical analysis. This has the disadvantage, that the system has to be operated under suboptimal conditions for a certain time period.

There is a need to provide systems with an automatic evaluation, whether a set of applications in a certain system have an improvement potential.

SUMMARY

At least one embodiment of the present invention improves the assessment of improvement potentials in a computing infrastructure. In at least one embodiment, the disadvantages, mentioned above should be reduced or even eliminated.

Advantageous embodiments are the subject matter of the claims, the description and the figures.

According to a first embodiment, the invention relates to a computer-implemented method for automatically calculating an improvement result for operating a set of applications. The applications may particularly be medical applications for example used in a hospital environment, processing standardized data. The applications are used in a platform infrastructure. The method comprises:

Providing a set of registered (medical) applications for improvement evaluation, wherein registering an application comprises adding a self-declaration interface or with other words providing the application with a self-declaration interface. The self-declaration interface is adapted to provide a self-declaration by way of a formula, indicating, whether the application is operated successfully (i.e. under success conditions). The success conditions are preferably pre-defined during development of the application and reflect those operating conditions, which are required to deliver optimal performance of the application in the respective operating context (input data, configurations and/or other operating conditions). The success conditions may e.g. be pseudo coded on a generic level as "deliver result every 10 minutes" and "deliver result in format ABC" and "provide meta data with parameters XYZ" and other conditions.

Collecting measurement data during runtime of at least one registered application. The application may be executed in a computing infrastructure, in which multiple applications are executed in parallel. The collected measurement data are used for filling the formula of the at least one registered application. With other words: The collected measurement data are prepared to be introduced in the formula (e.g. by formal adaptions).

Transferring the filled formula, i.e. with the collected measurement data, to an evaluation unit.

Accessing the evaluation unit for evaluating the formula according to pre-defined criteria.

Providing an improvement evaluation result, reflecting an improvement potential for the application to be operated in the set of applications.

In yet another embodiment, the present invention may relate to an improvement evaluation system for automatically calculating an improvement result for operating a set of applications, each of the applications processing standardized data, in a platform infrastructure, the system comprising:

A set of registered applications, in particular medical applications, for improvement evaluation, wherein each of the registered applications comprises:
a declaration interface which is adapted for providing a self-declaration by way of a formula, indicating, whether the application is operated under pre-defined success conditions;
A collector, which is adapted for collecting measurement data during runtime of at least one registered application, wherein the collected measurement data are introduced in the formula of the at least one registered application;

A network for transferring the formula with the collected measurement data from the local application environment to:

An evaluation unit, which is adapted to evaluate the transferred formula according to pre-defined criteria;

A result interface for providing an improvement evaluation result, reflecting an improvement potential for the respective application to be operated in the set of applications.

At least one embodiment of the invention, in particular embodiments of the method mentioned before, may be provided as a computer program loadable into a processing unit of a network unit, e.g. a physician's (for example mobile) device and/or a hospital server. The computer program comprises code adapted to perform the steps of the method as mentioned before when processed by the processing unit. The computer program may be stored on a computer readable medium or data carrier, like a memory stick. The computer program may also be downloaded in downloadable form from a server entity. The computer program may be virtualized and/or may be distributed over different network nodes.

At least one embodiment of the invention is directed to a computer-implemented method for automatically providing an improvement evaluation result for operating a set of applications, which are adapted for processing standardized data in a platform infrastructure, the method comprising:

providing a set of registered applications for improvement evaluation, wherein registering each respective application, of the set of registered applications, includes adding a self-declaration interface, usable to provide a self-declaration of the application by way of a formula, indicating whether each respective application, when registered, is operated successfully;

collecting measurement data during runtime of at least one registered application of the set of registered applications, to be introduced in the formula of the at least one registered application;

transferring the formula, with the measurement data collected, to an evaluation unit; and accessing the evaluation unit, to evaluate the formula transferred according to pre-defined criteria, to provide the improvement evaluation result, reflecting an improvement potential for each respective registered application to be operated in the set of registered applications.

At least one embodiment of the invention is directed to an improvement evaluation system for automatically providing an improvement evaluation result for operating a set of applications, each of the applications of the set of applications processing standardized data in a platform infrastructure, the system comprising:

a set of registered applications for improvement evaluation, each respective registered application, of the set of registered applications, including:
  a declaration interface, adapted to provide a self-declaration by way of a formula, indicating whether each respective registered application is operated under pre-defined success conditions;
  a collector, adapted to collect measurement data during runtime of at least one registered application of the set of registered applications, the collected measurement data being introduced in the formula of the at least one registered application;
  a network to transfer the formula, with the measurement data collected, to an evaluation unit;
the evaluation unit, adapted to evaluate the formula transferred, according to pre-defined criteria; and
a result interface to provide the improvement evaluation result, reflecting an improvement potential for each respective registered application to be operated in the set of applications.

BRIEF DESCRIPTION OF THE DRAWINGS

In the following, the invention will further be described with reference to exemplary embodiments illustrated in the figures, in which.

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

According to a first embodiment, the invention relates to a computer-implemented method for automatically calculating an improvement result for operating a set of applications. The applications may particularly be medical applications for example used in a hospital environment, processing standardized data. The applications are used in a platform infrastructure. The method comprises:

Providing a set of registered (medical) applications for improvement evaluation, wherein registering an application comprises adding a self-declaration interface or with other words providing the application with a self-declaration interface. The self-declaration interface is adapted to provide a self-declaration by way of a formula, indicating, whether the application is operated successfully (i.e. under success conditions). The success conditions are preferably pre-defined during development of the application and reflect those operating conditions, which are required to deliver optimal performance of the application in the respective operating context (input data, configurations and/or other operating conditions). The success conditions may e.g. be pseudo coded on a generic level as "deliver result every 10 minutes" and "deliver result in format ABC" and "provide meta data with parameters XYZ" and other conditions.

Collecting measurement data during runtime of at least one registered application. The application may be executed in a computing infrastructure, in which multiple applications are executed in parallel. The collected measurement data are used for filling the formula of the at least one registered application. With other words: The collected measurement data are prepared to be introduced in the formula (e.g. by formal adaptions).

Transferring the filled formula, i.e. with the collected measurement data, to an evaluation unit.

Accessing the evaluation unit for evaluating the formula according to pre-defined criteria.

Providing an improvement evaluation result, reflecting an improvement potential for the application to be operated in the set of applications.

In a preferred embodiment of the present invention, the formula may comprise a plurality of data fields, yielding the different operating conditions for the application (which could be evaluated as being successful or not). For example, the formula may comprise a time period for providing output data, like measurement data, e.g. "provide measurement data every hour". Further, the formula may comprise a format, in which the output data should optimally be provided (e.g. DICOM). Moreover, the formula may comprise a range for the output data.

In a preferred embodiment of the present invention, a new application is added to the set of registered applications based on the improvement evaluation result. In particular, based on the improvement evaluation result a new or amended application (e.g. a new version) may be added or suggested to be added to an AppStore. The AppStore is accessible for the client device.

In another preferred embodiment of the present invention, collecting measurement data of the at least one registered application is executed in a first or source runtime environment and wherein a matching algorithm is executed to find one or more second or target runtime environments, which are identified to be similar to the source runtime environment. In case one or more similar target runtime environments are identified, the recommendation result, which was calculated for the source runtime environment, is provided for the target runtime environment, too. The recommendation result comprises the improvement evaluation result.

The matching algorithm preferably uses pre-defined matching criteria. The matching algorithm may also be based on input data to be processed by the application. For example, a first application may have the functionality to reconstruct raw data, generated by an MR scanner; if a second application also processes raw MR data, a rule may define, that the first and the second application are similar.

The rules may be stored in a central database and may as an advantage be changed also during runtime of the system and during execution of the matching algorithm as well. With this feature, it is possible to automatically transfer improvement results from one execution context to another one with similar execution requirements and conditions. Moreover, it is possible to consider runtime environment and processed input data of the applications. This makes it possible to provide the improvement recommendation for a foreign system more specifically and beforehand without any calculations on the foreign system.

According to a preferred embodiment, the formula is application specific and is generated in a development phase of the application. This has the advantage that the developer is able to define the essential parameters which contribute to the performance of the application. For example, an application may have the functionality to provide a first, second and third type of output or result data, but only the first output is considered to be relevant for performance evaluation of the application. Thus, only the first type will be included in the formula. In another embodiment, result data may be provided with different grades of precision and accuracy. The formula may be configured to require result data above a reconfigurable precision threshold. If these result data may not be provided by the application, the respective parameter in the formula remains void or empty and the formula may later be processed, taking into account this embodiment.

Evaluating the formula may also comprise to compare the included measurement data with background data and historic data. The term "background data" refers to static data which serve as reference data to solve the initial value problem ("Anfangswertproblem"). Background data may therefore be construed as static data that can be configured to be used especially at the beginning of the improvement procedure when there is not a lot of historic data. The background data can e.g. tap into general medical knowledge.

Evaluating the formula may also comprise to process key performance indicators which are configured independently from the respective registered application. In particular, the key performance indicators may reveal an overall judgement over the set of registered applications and/or other platform services, which are defined by another instance or by another actor. Thus, the key performance indicators are preferably not defined by the (developer of) the application itself. This helps, to also include superordinate and superior indicators or parameters, which are superordinate and superior to the application itself.

In another preferred embodiment, evaluating the formulae from different applications comprises processing mutual dependencies between the different applications and its data, being processed by the applications. The platform can access all the data and all the formulae provided by all the applications. The platform does access any of these in a random-access fashion without access control. To enable this, the platform operates a data store that is used by the platform itself and all the applications.

In another preferred embodiment, introducing the collected measurement data into the formula is executed by way of an aggregation algorithm. The aggregation algorithm aggregates the collected measurement data into the formula into particular fields of the formula.

In another preferred embodiment, the steps of collecting, evaluating and/or providing are executed automatically and periodically. This has the advantage that the evaluation process may be executed according to a pre-defined scheme. Further, the evaluation unit may request the necessary data from the registered applications. Thus, triggering the data request is done by the evaluation unit and may thus, be triggered centrally from the evaluation unit.

In another preferred embodiment of the invention, the formula is provided by the application automatically by using stored rules of a rules engine and a stored decision logic. In particular, evaluating the formula is done by an evaluation algorithm which is designed to find a set of prioritized improvement recommendations for the set of applications.

In another embodiment, the present invention may be implemented as computer program, tangibly embodied in a machine-readable storage medium, including instructions operable to cause a computer to perform the method steps according to any of the method claims above.

In yet another embodiment, the present invention may relate to an improvement evaluation system for automatically calculating an improvement result for operating a set of applications, each of the applications processing standardized data, in a platform infrastructure, the system comprising:

A set of registered applications, in particular medical applications, for improvement evaluation, wherein each of the registered applications comprises:
  a declaration interface which is adapted for providing a self-declaration by way of a formula, indicating, whether the application is operated under pre-defined success conditions;
  A collector, which is adapted for collecting measurement data during runtime of at least one registered application, wherein the collected measurement data are introduced in the formula of the at least one registered application;
A network for transferring the formula with the collected measurement data from the local application environment to:
An evaluation unit, which is adapted to evaluate the transferred formula according to pre-defined criteria;
A result interface for providing an improvement evaluation result, reflecting an improvement potential for the respective application to be operated in the set of applications.

According to a preferred embodiment, the evaluation unit and/or the result interface of the improvement evaluation system may be deployed on a platform. The platform may be a central server platform.

In the following a definition of terms used within this application is given.

The improvement evaluation result is a data set representing whether or not the registered application is operated successfully or under successful operating conditions, which have been defined by the application itself in the self declaration. Further, the improvement evaluation result (in short: result) may comprise to prioritize successful applications in order to 'promote' successful applications (in short: app/apps) as 'preferred' apps. The result may further comprise calculated changes in the app-internal optimization factors, like parameter changes etc.

The application or app may be a medical and/or non-medical application or service. The app is characterized to be used in a medical or clinical context. It refers to a digital app. The app is an executable program code. The app needs a processor to be executed.

The platform infrastructure is a computing infrastructure which may be hosted on a computer device or network. The platform infrastructure may provide and run several applications. The set of applications may be designated as AppStore. The AppStore may have a user interface for selecting apps to be used and implemented. The App Store also has a database with all the applications and accompanying marketing content for each application (app screenshots, app descriptions etc.). The platform infrastructure has an additional dedicated data store.

Registering an application means to subscribe or sign on to the automatic improvement service. Only those applications which are registered are allowed to take part in the improvement service and to receive the improvement evaluation result. All the registered applications need to be prepared specifically. In particular, they need to be provided with a self-declaration interface for providing and transmitting the self-declaration.

The self-declaration is a digital data structure comprising at least one variable or parameter of a formula, yielding successful operation of the application. The values for the formula are defined by the collected measurement data. The successful operation of the application is defined by the application itself during development of the same. Preferably, the self-declaration and the respective formula comprises at least a part of the results of the application if the application provides a quantifiable result. Otherwise, special parameters or conditions may be defined.

Collecting measurement data may be executed by way of a AppMeasureService. This service triggers the registered app to perform its specific operations and functions on the input data sets. This service can also select random data sets in the compatible formats to run experiments on the apps.

The AppMeasureService provides generic REST interfaces (REST: Representational State Transfer, which defines a set of constraints to be used for creating web services), where apps have to submit measurements, that were based on the input data, containing {datetime, app, measurement.type, measurement.value}. When the app registers with this AppMeasureService through REST interface, the app commits to be able to submit measurements with e.g. a dedicated frequency {app, measurement.type, occurrence}. The AppMeasureService then triggers measurements accordingly and the subsequent evaluation steps, in cooperation with other platform services (calculation of real success, possible adjustments, elevation to preferred app). Further, this service updates the LiveContexts for the configured 'owner' of that LiveContext (usually a hospital department), for own and foreign LiveContexts.

The matching algorithm is executed without user interaction in a fully automated manner. The purpose of the matching algorithm is to make two application execution environments, i.e. hospitals (source/target) comparable in terms of live data streams in these hospitals, in a way, that also the initial set of improvements can be achieved in the target hospital without measurements, as found in the source hospital with measurements. This feature improves efficiency and saves weeks at project start-up. A so called LiveContext compiles predefined data about one hospital, and this data comprises key performance and business data (e.g. studies per year) and a set of applications that have pointed to improvements in this hospital (the registered apps in the source hospital, including preferred apps, if any). The LiveContext defines matching criteria to calculate similarity of two hospitals. If two LiveContexts match, they are evaluated as being similar and an AppRecommendationService fills the target AppStore with the same Apps as in the source AppStore. Then, because the target AppStore isn't empty any more, measuring apps can start immediately also in the target hospital, which in turn might change the target AppStore.

The recommendation result may be delivered by way of an AppRecommendationService. The AppRecommendationService performs the LiveContext matching and uses the results to re-arrange the AppStore contents and/or to assign dedicated measurement tasks to the AppMeasureService. The AppRecommendationService may also automatically classify successful apps as 'preferred apps' in the AppStore, which are then visible to the users in a prominent spot in the user interface.

Aggregation algorithm is executed without user interaction in a fully automated manner. The purpose of the aggregation algorithm is to collect and aggregate the different measurement data with respect to the registered app and to introduce them into the formula. This means to input data at the correct location in the correct format into the formula. With this feature, it is possible to provide a standardized format of the formula and to improve the processing of the formula.

The evaluation algorithm is also executed without user interaction in a fully automated manner. The purpose of the evaluation algorithm is to evaluate the received formula. The evaluation algorithm resolves contradictions between the apps (e.g. if a first app needs data to be provided as result data from a second app and it has been evaluated that the second app does not provide the data in the correct format, so that the first app may process the same, then such a contradiction is identified and may be resolved by suggesting as an improvement to provide the result data by the second app in the appropriate format).

The evaluation algorithm may be adapted to perform data transformation to resolve the data incompatibility issues, along the DICOM Standard and the technical data structure information from the application self-declarations using attribute set comparisons. Configurable algorithms can work on different attribute sets. The evaluation algorithm may be implemented as AppSuccessService.

The AppSuccessService evaluates the registered success formula from each app and registers a success or failed run on the input data. Additionally, this service protects the AppStore from being malformed or even cheated by inappropriate app behavior or results during measurements and experiments, by handling of key performance indicators (KPI) that can be configured independently of apps and their (local) success formulas, and by comparing KPIs against reported app success. Configured KPIs are the master to the overall judgement over the apps. This AppSuccessService provides generic REST interfaces, where apps have to register, and where apps have to submit their own 'success criteria', which this service can both use on current measurements but also on background and historic data, and thereby compare apps against each other, or detect improvements by comparing the app against the data background. The REST interface contains {app, measurement.type, measurement.successcriteria}.

Providing an improvement evaluation result may comprise an AppAdjustService. The AppAdjustService calculates changes on the app-internal optimization factors, e.g. changes in the parameters that the app takes as prerequisites to perform its functions. Also, any type of global adjustment along the clinical pathway can be registered (manually), so the efficiency of improvements can be controlled with apps in the subsequent data, e.g. for PatientScheduling to reduce PatientChangeTime and updates for the installed scan protocols to reduce dose, contains {datetime, adjustment.type, organizationinfo, deviceinfo}. This Service provides generic REST interfaces accordingly, also e.g. where apps have to register, and submit possible adjustments they can obtain, e.g. before running the next measurement step, containing {app, measurement.type, adjustment.type}.

At least one embodiment of the invention, in particular embodiments of the method mentioned before, may be provided as a computer program loadable into a processing unit of a network unit, e.g. a physician's (for example mobile) device and/or a hospital server. The computer program comprises code adapted to perform the steps of the method as mentioned before when processed by the processing unit. The computer program may be stored on a computer readable medium or data carrier, like a memory stick. The computer program may also be downloaded in downloadable form from a server entity. The computer program may be virtualized and/or may be distributed over different network nodes.

The computer program may be offered, placed on market, used, imported and/or stored as (and thus may be part of) a computer program product. Thus, the computer program may be provided on a storage medium (computer readable medium, like a computer disc or a memory stick etc.). Alternatively, the computer program may be provided via download by way of a respective network connection to a server, which stores the computer program by providing a link to the server with the computer program stored thereon. A "computer-readable medium" or "storage medium" can be any device that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

The term "computer" refers to any electronic device comprising a processor, such as a general-purpose central processing unit (CPU), a specific purpose processor or a microcontroller. The processor is adapted to execute a special computing task, namely for providing the improvement evaluation result. A computer is capable of receiving data (input), of performing a sequence of predetermined operations thereupon, and of producing thereby a result in the form of information or signals (output). Depending on context, the term "computer" will mean either a processor in particular or can refer more generally to a processor in association with an assemblage of interrelated elements contained within a single case or housing.

The systems and methods described herein may be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer readable medium, which include storage devices and signals, in compressed or uncompressed form.

An embodiment of the present invention relates to computer systems and methods for providing improvement-as-a-service. Further, the 'aging' of applications in AppStores should be prevented.

In hospitals, novel applications need to be provided, if e.g. clinical pathways are to be changed or additional services should be rendered.

If a vendor develops a (new) application, a problem that arises initially is that the vendor cannot exactly match the new application against existing medical data on-site to show evidence. Further, the user on-site might not want to spend the efforts to do the evaluation. The proposed solution provides a mechanism to overcome this problem.

Moreover, at least one embodiment of the invention overcomes another problem which arises from the natural AppStore aging, which impacts both an application and the AppStore's portfolio, because the influence factors for proven outcomes have changed altogether even after a few weeks, which are application versions, health records, PACS data, implemented changes along the clinical pathway, so the decision for the relevance of an application needs some update, and also the portfolio to-be-used needs an update, and also the new improvements along the clinical pathway might not be detected if an aged AppStore content is used.

In large hospital chains, the product portfolio is standardized, but local business variability requires to e.g. filter out standardized solutions that might not be needed now, but may be later. Today, such a process is done manually, and becomes tedious and error-prone, because the digitalization trend provides more finer granular solutions and because the clinical pathways change time and again, both of which require more frequent and more detailed decision taking.

The proposed solution is an automated approach to resolve the presented problems in an automated manner by way of a novel infrastructure with add-ons to apps and AppStore, thus avoiding also aging effects in AppStore, and this solution supports adherence to the business variability, by providing a novel AppStore assessment infrastructure, which provides Improvements-as-a-Service as a new technical paradigm.

The novel paradigm Improvements-as-a-Service requires a dedicated infrastructure. Before an app is put into the AppStore, and also for apps in the AppStore, the platform services in the novel infrastructure 'revisit' the apps, and only on overall success, the apps remain in the AppStore and/or are ranked as preferred apps, which in turn means automated AppStore-Anti-Aging. The entire procedure is automated and runs repeatedly.

The novel set of AppService components auto-performs continuous and unattended evaluation of multiple portfolios in AppStores, in order to auto-detect and show 'preferred' AppStore contents for a given user work experience on the one hand, and avoid 'aging' of AppStore contents on the other hand, with LiveContext based adaptation mechanisms on apps in the AppStore. This provides Improvements-as-a-Service as a new and dedicated paradigm shift, from product based solutions to situation based solutions.

Figure 1:
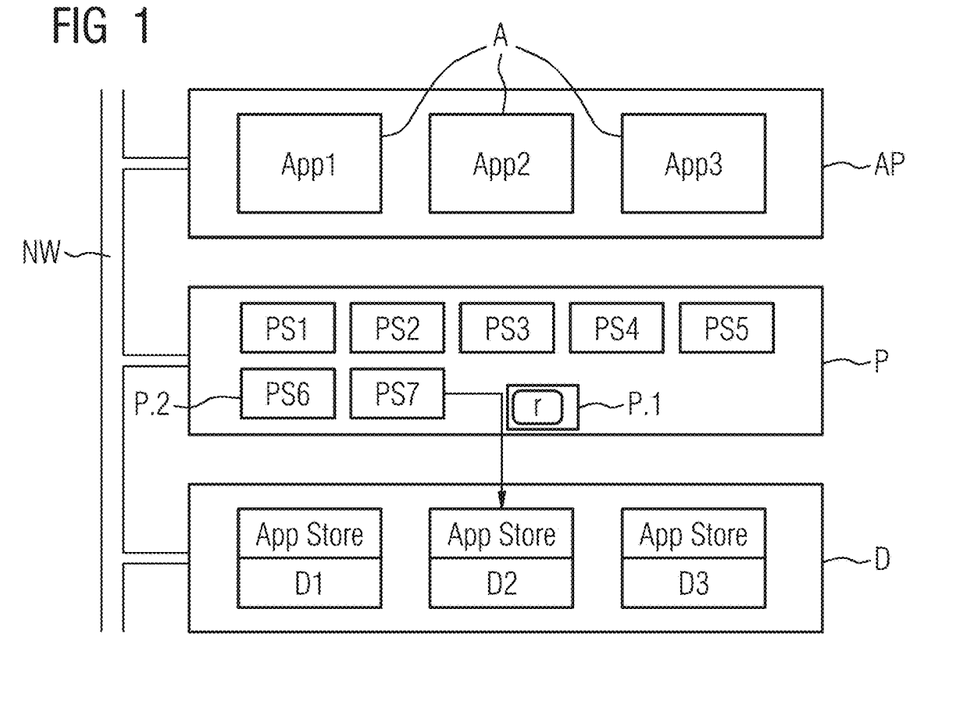
FIG. 1 is a schematic overview figure of the system architecture according to a preferred embodiment of the present invention.

FIG. 1 shows the architecture overview and working model. The depicted medical platform P (also called platform infrastructure) in this figure makes use of medical and non-medical data sources from the hospital for multiple purposes.

A set of applications A have to be prepared for participating in the improvement as a service system, proposed herein. FIG. 1 shows by way of example, a first application App1, a second application App2 and a third application App3 which are provided by an AppProvider AP. The AppProvider may be a third party. The applications (abbreviated as apps) are in data exchange over a network NW with the infrastructural platform P.

The platform P comprises and provides a set of functions or services, which are explained in more detail below:

An AppRegisterService PS1
An AppinstallService PS2
An AppinputService PS3
An AppMeasureService PS4
An AppAdjustService PS5
An AppSuccessService PS6
An AppRecommendationService PS7.

In particular, the AppRegisterService PS1 gets endpoint of all services to register with. This is based on REST interfaces building connections to the other services PS2 to PS7.

The AppRegisterService PS1 mediates between an application and the AppStore, and between the app and the platform of infrastructure services, and manages the internal data history (app configs, measurement definitions and results, list of platform services, own and foreign LiveContexts, own and foreign data receiver connections). Each app is either in the AppStore and taken out for re-evaluation automatically, or shall be submitted to the AppStore manually and requires evaluation. In either case, this Service is in charge first. The AppRegisterService PS1 provides each app with endpoints to the other services to register with, by providing the REST interfaces of the other services. The Service finally calculates, based on the overall results from the other services, if an app is shown in the AppStore at all, or if shown as preferred app. The Service updates and stores its own LiveContext with re-measuring the parameters of the LiveContext with the help of the AppMeasureService. The Service obtains and stores foreign LiveContexts from other sites and matches them against its own LiveContext (threshold based parameter comparison). If a matching context contains newer preferred apps, this Service re-uses these preferred apps in the local AppStore.

The AppinstallService PS2 is adapted to register the app A by installing a URL link. The AppinstallService PS2 can install all apps in the run-time environment of the platform infrastructure P, e.g. at the beginning of a live measurement, for assessing an app A, if it can be elevated to a preferred app in the AppStore. This Service provides a REST interface, for apps to register their installation URL and app name with this Service.

The AppInputService PS3 is responsible for registering data input requests. In general, this service enables apps to register their requests for available data sources. For example, an app can say "I require a teamplay Receiver". Operational data is then handled by the receiver of the platform infrastructure. The AppInputService PS3 provides the requested input data to the apps, from the underlying data lake with medical and non-medical data, and from the local Receiver, in order to retrieve data from PACS. This Service provides a REST interface, for apps to register their data source (like teamplay receiver instance), classification of valid input data (e.g. DICOM RDSR, Series), and app name with this Service.

The AppMeasureService PS4 is adapted to execute the measurements during execution of the respective app in its runtime context. It collects measurement data, like runtime data, required I/O-resources, used processing resources (memory, bandwidth, CPU etc.) and other technical data. The measurement data may be provided in different formats and may be collected at different time intervals and frequencies. This may be configured by the app in the formula.

The AppAdjustService PS5 registers and provides a link, e.g. a URL, for automated adjustments of application parameters, like protocol adjustments, protocol exchanges, and other technical parameters. In another example embodiment, the algorithms detect that the examinations are not assigned during scheduling in an optimal way to the existing modalities. The suggestion would then be: perform the assignment of the examinations to the existing modalities in a different way during scheduling, so that e.g. the utilization of the modalities is higher.

The AppSuccessService PS6 registers success of the app and evaluates its formula and optionally evaluates the success compared to other apps and/or compared to historic data. The AppSuccessService PS6 may be implemented on an evaluation unit P.2.

The AppRecommendationService PS7 provides an improvement recommendation in the form of an improvement evaluation result r. An app A is only provided and made available at the AppStore if all the registration services PS1 to PS7 have been satisfied. The result r is provided by a result interface P.1.

So called LiveWrappers are optionally deployed. Live Wrappers might be needed as bridges, in order to connect and integrate a given app to the REST interfaces of the services in the infrastructure P, if e.g. a new application can't connect to the interfaces, or if the above services PS 1, . . . PS7 can't reach the app for automated measurement or adjustment directly.

As can be seen in FIG. 1, several computer-based user devices D are part of the system and are connected via the network NW. Each of the devices D may access the AppStore with the apps A, which have been evaluated by the registration services PS 1 to PS7. All or a selection of devices D may access the AppStore in order to install or load the apps A.

Figure 2:
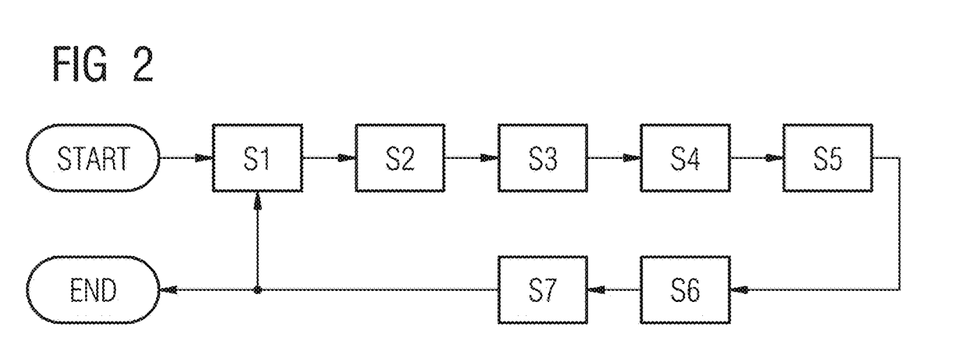
FIG. 2 is a flow chart of a method for automatically calculating an improvement result for operating a set of applications.

FIG. 2 is a flow chart of the method according to a preferred embodiment of the present invention. After Start of the method, in step S1 one application A of a set of applications is registered. This means, that the application is selected to participate in the automatic improvement procedure, described herein. In step S2 measurement data are collected during runtime of the registered app. In step S3 the measured data ae introduced into the self-declaration formula f, which is filling the data structure with appropriate data. In step S4 the formula f is transferred to the infrastructure platform P and in particular to the evaluation unit P.2 and the AppSuccessService PS6. In step S5, the received formula f is being evaluated in order to provide the improvement evaluation result r in step S6. In step S7, optionally, a new application may be added to the AppStore based on the evaluation in step S5. The evaluation may comprise a ranking of the app in the context of the other applications. After this, the method may end or may be iterated by branching to step S1 again.

Figure 3:
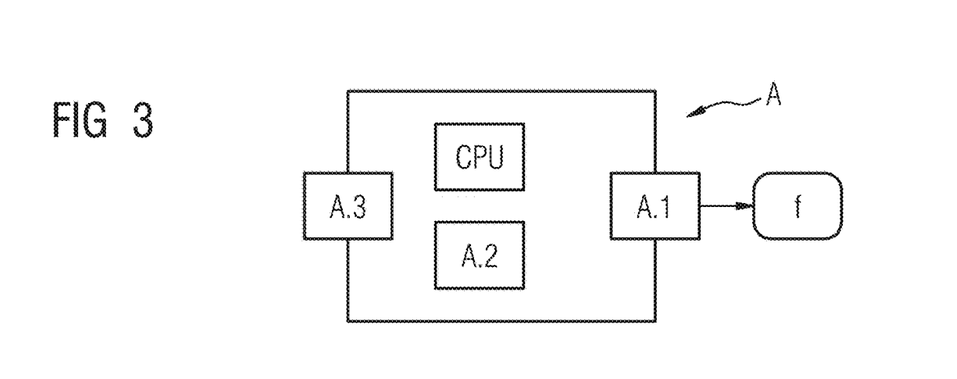
FIG. 3 shows a block diagram of a registered application according to a preferred embodiment.

FIG. 3 shows a block diagram of an app A. The app comprises a (self-)declaration interface A.1 for providing the formula f. The formula is to be transferred to the platform P for evaluation. The app A further comprises a central processing unit CPU for data processing and a collector A.2 for collecting measurement data. The app further comprises an input interface A.3, which may be used for receiving input data.

For matching the contexts (for processing similar apps so that the improvement result r may be transferred to these similar apps), rules may be defined and applied, which consider inter alia:

The number of scanners
Scanner types by modality
Number of studies per year
Number of connected receivers
Privacy level
Number of active users
Number of locations
Available licenses and others.

For example, a rule may be defined which requests that at least 80% matching is necessary concerning the number of scanners in order to evaluate a context as being similar. Another rule may specify that if 50% of the locations match, the contexts may be judged to be similar in this respect.

In the following, at least one embodiment of the present invention is described with respect to a dose app, which aims at reducing the dose for the patient in the context of a medical application (e.g. contrast agent).

In a first step, the new dose app is auto-installed at the infrastructure P, automatically from AppStore, or manually from an app submission page. In a second step, the dose app registers necessary interfaces and configuration with new infrastructure Services Psi. In a third step, data input is executed by connecting to TP-Receiver in the hospital, in order to have access to medical and/or non-medical data, and multiple data setups from multiple devices are needed to run multiple measurements. In a fourth step, dose measurement data are collected (measure: dose (over time, used protocols) for a time period (e.g. last week) for e.g. abdomen in this department), and detect outliers. In a fifth step, an adjustment is executed. New protocol(s) used for same or comparable scanner type are evaluated. In the sixth step, the success is evaluated. A success may for example be defined as "At least 10% cumulative dose reduction is possible with new protocol type", wherein either, the protocol was used and re-measured or comparison and forecast was done based on Context data from another department, site, or hospital. So, the improvement evaluation result r proposes this protocol as improvement. The result r may comprise a recommendation for decision: On Success only (with improvement reported at least for one input data setup), TP-Dose is marked as recommended in the novel AppStore. As the overall result, the evidence of an improvement has been shown automatically. The result r shows where exactly the improvement is possible, and what app is the 'winner'. This paradigm Improvements-as-a-Service works in an automated manner with the novel services. By continuous repetition of the measurement, the detected improvement is safe-guarded.

Another example application refers to a usage app, for reducing patient change times. The steps, mentioned in the example above are also carried out. This comprises the capability configuration, which classify the app, e.g. for topic 'PatientChangeTime', input data 'DICOM Series', and output formats (to be read by humans only or to be integrated into subsequent systems). Patient-change-times are measured for a time period (e.g. last week for CT scanners in this department). Afterwords, median and other statistical data are calculated and outliers are detected. A new scheduling format may be introduced, as auto-suggestion for improvement, which is calculated by the app based on usage patterns. For example, at least 10% reduction of PatientChangeTime is required as per formula for success, so re-measurement takes place automatically after the improvement was implemented, and the measurement service will be triggered e.g. a week later again.

The infrastructure services can also run experiments, with e.g. before/after the matches. For a given task with its capability configuration (e.g. count metastases in the lung in CT scan), the services retrieve a complete data set, then remove configured portions of the data, inject the data into the formula, transfer it to the evaluation unit P.2, on app success compare the output data against the original data, and calculate the real success (e.g. found less or more metastases). Such tasks can be configured at run-time, e.g. in terms of medical diseases, input data (e.g. DICOM Structured Report), experiment details, threshold for overall success. The infrastructure now can search for apps the meet the input criteria and run experiments continuously, which might result in a new app to be presented in the AppStore.

The digitalization aware proofing infrastructure P consists of a novel set of AppService components, that auto-perform continuous and unattended evaluation of multiple portfolios in AppStores, in order to auto-detect and show 'preferred' AppStore contents for a given user work experience on the one hand, and avoid 'aging' of AppStore contents on the other hand, with LiveContext based adaptation mechanisms on apps in the AppStore. This provides Improvements-as-a-Service as a new and dedicated paradigm shift, from product based solutions to situation based solutions.

An advantage is the configurable novel LiveContext and automatic calculation and transfer cross-site/cross-hospital. Using LiveContexts can resolve the initial ramp-up contradiction, and allow detecting needs for portfolio updates, may be faster than the background measurements. The LiveContext definition is extensible and configurable and contains static and dynamic embodiments of a real (sub)unit of an institution, where each embodiment is either medical and/or non-medical information from the currently defined clinical pathways in this (sub)unit. When comparing LiveContexts, the result evidence can be based on the intersection of common embodiments and also a subset of these. LiveContexts definitions and their calculation algorithms have to be configured with the novel Infrastructure. LiveContexts thereby support automated inter-site management for larger institutions, for example, if the LiveContexts form two sites match, the preferred applications in the AppStore(s) for the two sites are identical.

All this is enabled, because LiveContexts act as a pointer to measurement data and application portfolios. With LiveContext extensions for Organ and Study throughput, for example, the portfolio updates between site A and site B, comprises also preferred applications on data like organs and study per year, without running the infrastructural experiments on these apps. Moreover, a novel infrastructure with novel AppServices allows, at run-time, to collect required medical and/or non-medical, app measurement data, and LiveContext relevant data, retrieved from PACS and repositories of the novel infrastructure.

Such data is used for repeated measurements on app evaluation along the defined multiple dimensions, comparing apps against each other, assessing single apps, in order to create a portfolio of 'preferred applications'. Instead of 'image reading' perform automated 'app portfolio reading', and shape the AppStore contents accordingly. Further, the technical device is novel RESTful interfacing between AppService, the AppStore and the Apps, and a semantic pre-configuration of how to 'remotely' measure the outcomes for real medical data from e.g. the teamplay receiver and PACS. The REST interfaces can be provided either by the LiveWrapper or the app under measurement.

The technical advantages of at least one embodiment are summarized in the following.

Improvements-as-a-Service with the novel infrastructure may be provided. An automated 'diagnostic process' in terms of App Portfolios and AppStores may be provided, too. Anti-Aging evaluation for the set or portfolio of apps in the AppStore is ensured. Auto LiveContext generation and cross-site context exchange is provided, in order to bridge gaps during ramp-ups, updates, substitute missing measurements, quicker detection of aged information (in the AppStore and also in the context). LiveContexts support automated inter-site management. Medical evidence of app results and business relevance are ensured and fraud may be defended. Preferred Apps in the AppStore also have, on the workplace, data access by way of the RESTful interfacing (un-common to today's AppStores). It is possible, to search for apps that fit automatically with the medical need. Improved and optimized function sets are visible at the workplaces, together with e.g. automated house-keeping for adding/removing functionality, applications, tools, based on an AppStore. Finally, auto configuration of apps is provided in order to integrate the app in a native and light weight manner into the technical infrastructure and the underlying data lake.

A major feature and advantage is to be seen in that a two level evaluation of success and improvement is provided. The two levels may be correlated. The first level refers to local or internal success evaluation by the app by way of the formula f and the second level refers to the external overall success evaluation by platform infrastructure P. This feature has the technical effect to prevent cheating the AppStore, with arbitrary configurable checks on platform level (from Boolean to Artificial Intelligence).

The scope of protection of the present invention is specified by the appended claims and is not restricted by the features explained in the description or shown in the drawings.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A computer-implemented method for automatically providing an improvement evaluation result for operating a set of applications, which are adapted for processing standardized data in a platform infrastructure, the computer-implemented method comprising:

provi­ding a set of registered applications for an improvement evaluation, wherein registering a respective application, among the set of registered applications, includes adding a self-declaration interface to provide a self-declaration of the respective application by way of a formula, wherein the self-declaration is a digital structure including at least one variable or parameter of the formula indicating whether the respective application, when registered, is operated successfully or under successful operation conditions;

collecting measurement data at runtime of the respective application, the measurement data to be introduced into the formula of the respective application;

transferring the measurement data and the formula of the respective application to an evaluation unit; and accessing the evaluation unit, to evaluate the formula of the respective application according to at least one criteria to provide the improvement evaluation result, the improvement evaluation result reflecting an improvement potential for at least the respective application, wherein the improvement evaluation result is a data set representing whether at least the respective application is operated successfully or under successful operation conditions, and the formula of the respective application includes a plurality of configurable data fields yielding different operating conditions of the respective application.

2. The computer-implemented method of claim 1, wherein a new application is added to the set of registered applications based on the improvement evaluation result.

3. The computer-implemented method of claim 2, wherein the collecting measurement data is executed in a source runtime environment, and the method includes executing a matching algorithm to find one or more target runtime environments similar to the source runtime environment, and providing a recommendation result for the one or more target runtime environments, the recommendation result including the improvement evaluation result.

4. The computer-implemented method of claim 3, wherein the matching algorithm uses a defined matching criteria.

5. The computer-implemented method of claim 1, wherein the collecting measurement data is executed in a source runtime environment, and the method includes executing a matching algorithm to find one or more target runtime environments, which are similar to the source runtime environment, and providing a recommendation result for the one or more target runtime environments, the recommendation result including the improvement evaluation result.

6. The computer-implemented method of claim 5, wherein the matching algorithm uses a defined matching criteria.

7. The computer-implemented method of claim 1, wherein the formula of the respective application is application specific and is generated during development of the respective application.

8. The computer-implemented method of claim 1, wherein the formula of the respective application is generated by the respective application based on stored rules of a rules engine and a stored decision logic.

9. The computer-implemented method of claim 1, wherein the accessing the evaluation unit comprises:

analyzing mutual dependencies between different applications among the set of registered applications, and analyzing processed data.

10. The computer-implemented method of claim 1, wherein the accessing the evaluation unit includes processing key performance indicators, the key performance indicators configured independently of applications among the set of registered applications.

11. The computer-implemented method of claim 1, wherein the accessing the evaluation unit is performed by an evaluation algorithm, the evaluation algorithm configured to find a set of prioritized improvement recommendations for the set of registered applications.

12. The computer-implemented method of claim 1, wherein the accessing the evaluation unit includes comparing the measurement data with at least one of background data or historic data.

13. The computer-implemented method of claim 1, wherein the collecting measurement data is executed by way of an aggregation algorithm.

14. A tangible machine-readable storage medium including instructions operable to cause a computer to perform the method of claim 1 when executed by the computer.

15. An improvement evaluation system for automatically providing an improvement evaluation result for operating a set of applications, each application, among the set of applications, processing standardized data in a platform infrastructure, the improvement evaluation system comprising:

a set of registered applications for improvement evaluation, a respective registered application, among the set of registered applications, including:

a declaration interface configured to provide a self-declaration of the respective registered application by way of a formula, wherein the self-declaration is a digital structure including at least one variable or parameter of the formula indicating whether the respective registered application is operated successfully or under successful operation conditions, a collector configured to collect measurement data at runtime of the respective registered application, the measurement data being introduced into the formula of the respective registered application;

a network to transfer the formula of the respective registered application and the measurement data to an evaluation unit;

the evaluation unit configured to evaluate the formula of the respective registered application according to at least one criteria; and a result interface to provide the improvement evaluation result, the improvement evaluation result reflecting an improvement potential for at least the respective registered application, wherein the improvement evaluation result is a data set representing whether at least the respective registered application is operated successfully or under successful operation conditions, and the formula of the respective registered application includes a plurality of configurable data fields yielding different operating conditions of the respective registered application.

16. The improvement evaluation system of claim 15, wherein
- the evaluation unit and the result interface are deployed on a central platform, and
- the central platform is configured to control the set of registered applications based on the improvement evaluation result.

17. An improvement evaluation system for automatically providing an improvement evaluation result for operating a set of applications, each application, among the set of applications, processing standardized data in a platform infrastructure, the improvement evaluation system comprising:
- at least one processor configured to execute a respective registered application, from among a set of registered applications for improvement evaluation, the respective registered application configured to
  - provide a self-declaration of the respective registered application by way of a formula, wherein the self-declaration is a digital structure including at least one variable or parameter of the formula indicating whether the respective registered application is operated successfully or under successful operation conditions, and
  - collect measurement data at runtime of the respective registered application, the measurement data being introduced into the formula;
- a central platform configured to
  - evaluate the formula according to at least one criteria, and
  - provide the improvement evaluation result, the improvement evaluation result reflecting an improvement potential for at least the respective registered application; and
- a network to transfer the formula and the measurement data to the central platform; wherein
  - the improvement evaluation result is a data set representing whether at least the respective registered application is operated successfully or under successful operation conditions, and
  - the formula includes a plurality of configurable data fields yielding different operating conditions of the respective registered application.

\* \* \* \* \*